(12) United States Patent
Kozyr et al.

(10) Patent No.: US 12,352,874 B2
(45) Date of Patent: Jul. 8, 2025

(54) DIGITAL MONITORING BADGE SYSTEM

(71) Applicants: Vera Kozyr, St. Petersburg (RU); Dmitrii Lukashev, St. Petersburg (RU); Egor Markov, St. Petersburg (RU); Igor Mikhnenko, St. Petersburg (RE)

(72) Inventors: Vera Kozyr, St. Petersburg (RU); Dmitrii Lukashev, St. Petersburg (RU); Egor Markov, St. Petersburg (RU); Igor Mikhnenko, St. Petersburg (RE)

( * ) Notice: Subject to any disclaimer, the term of this patent is extended or adjusted under 35 U.S.C. 154(b) by 344 days.

(21) Appl. No.: 17/577,885

(22) Filed: Jan. 18, 2022

(65) Prior Publication Data

US 2023/0228832 A1    Jul. 20, 2023

(51) Int. Cl.
| | |
|---|---|
| *G01S 3/803* | (2006.01) |
| *G01S 3/86* | (2006.01) |
| *G08B 5/36* | (2006.01) |
| *G08B 21/04* | (2006.01) |
| *G10L 15/00* | (2013.01) |
| *G10L 15/26* | (2006.01) |
| *G10L 17/04* | (2013.01) |
| *G10L 21/0216* | (2013.01) |
| *G10L 21/0272* | (2013.01) |

(52) U.S. Cl.
CPC ............... *G01S 3/803* (2013.01); *G01S 3/86* (2013.01); *G08B 5/36* (2013.01); *G08B 21/0446* (2013.01); *G10L 15/005* (2013.01); *G10L 15/26* (2013.01); *G10L 17/04* (2013.01); *G10L 21/0216* (2013.01); *G10L 21/0272* (2013.01); *G10L 2021/02165* (2013.01)

(58) Field of Classification Search
CPC .. G01S 3/803; G01S 3/86; G08B 5/36; G08B 21/0446; G08B 21/043; G08B 21/0453; G08B 13/1672; G08B 21/22; G10L 15/005; G10L 15/26; G10L 17/04; G10L 21/0216; G10L 21/0272; G10L 2021/02165; G10L 17/00; G10L 17/26; G10L 25/78; G06Q 30/01; G06Q 30/015; G06Q 10/06398; H04W 4/023
See application file for complete search history.

(56) References Cited

U.S. PATENT DOCUMENTS

| | | | |
|---|---|---|---|
| 5,479,408 A * | 12/1995 | Will | H04L 1/1854 340/7.22 |
| 2004/0158724 A1* | 8/2004 | Carr | G06F 21/31 713/186 |
| 2006/0220837 A1* | 10/2006 | Kozlay | G08B 27/001 340/5.82 |
| 2023/0228832 A1* | 7/2023 | Kozyr | G10L 17/04 367/124 |

* cited by examiner

*Primary Examiner* — Daniel Pihulic
(74) *Attorney, Agent, or Firm* — Larisa Migachyov

(57) ABSTRACT

A wearable badge for an employee that records and transmits audio from client interactions with the professional, comprising two microphones and two microphone channels that focus one microphone on the speech of the employee and the other microphone on the speech of the customer, making diarizing easier. The wearable badge also comprises a module to determine whether or not the employee is maintaining an appropriate social distance with customers.

20 Claims, 8 Drawing Sheets

DIGITAL MONITORING BADGE SYSTEM

CROSS-REFERENCE TO RELATED APPLICATIONS

This application takes priority from Provisional App. No. 63/139,149, filed Jan. 19, 2021, which is herein incorporated by reference.

BACKGROUND

Field of the Invention

The present invention pertains to audio recording and transmission devices, in particular to a wearable badge that records and transmits audio from client interactions.

Background of the Invention

Customer service personnel interact with numerous customers every day, typically when management is not present. It is important to be able to analyze and supervise an employee's behavior during customer interactions. Since a manager cannot be present at every interaction, a need exists for a system and method for performing this supervision and analysis remotely. Some of the parameters and behavior that may need analyzing are the conversation between the employee and the customer, any physical behaviors such as social distancing during a contagious disease epidemic, or any safety concerns like violence or physical incapacitation.

For easier analysis, it is important to diarize any recordings of a conversation. While diarization methods exist in the prior art, they typically require high levels of computational power. A need exists for a simpler method of diarization so that the salesperson's speech could be separated from a customer's speech, and each part of the conversation could be analyzed separately.

Furthermore, in a pandemic of contagious disease, it is important to monitor an employee's social distancing behavior. In some cases, the employee is not maintaining social distance from customers, which is an issue requiring discipline and impacting public health. In some cases, it is the customers who breach social distancing rules, which is an issue affecting workplace safety for salespeople as well as public health. Finally, social distancing, or lack thereof, is relevant to contact tracing, so that anyone who came in close contact with a person who is later found to be infected can be notified.

Moreover, due to the potential for violent incidents affecting employees, it is important to monitor for such incidents so that immediate assistance can be provided. Such incidents could include physical or verbal violence.

A need exists for a wearable audio badge for monitoring more aspects of a customer service interaction so that the employee's performance could be evaluated and so that their safety could be improved.

LIST OF FIGURES

SUMMARY OF THE INVENTION

Figure 1:
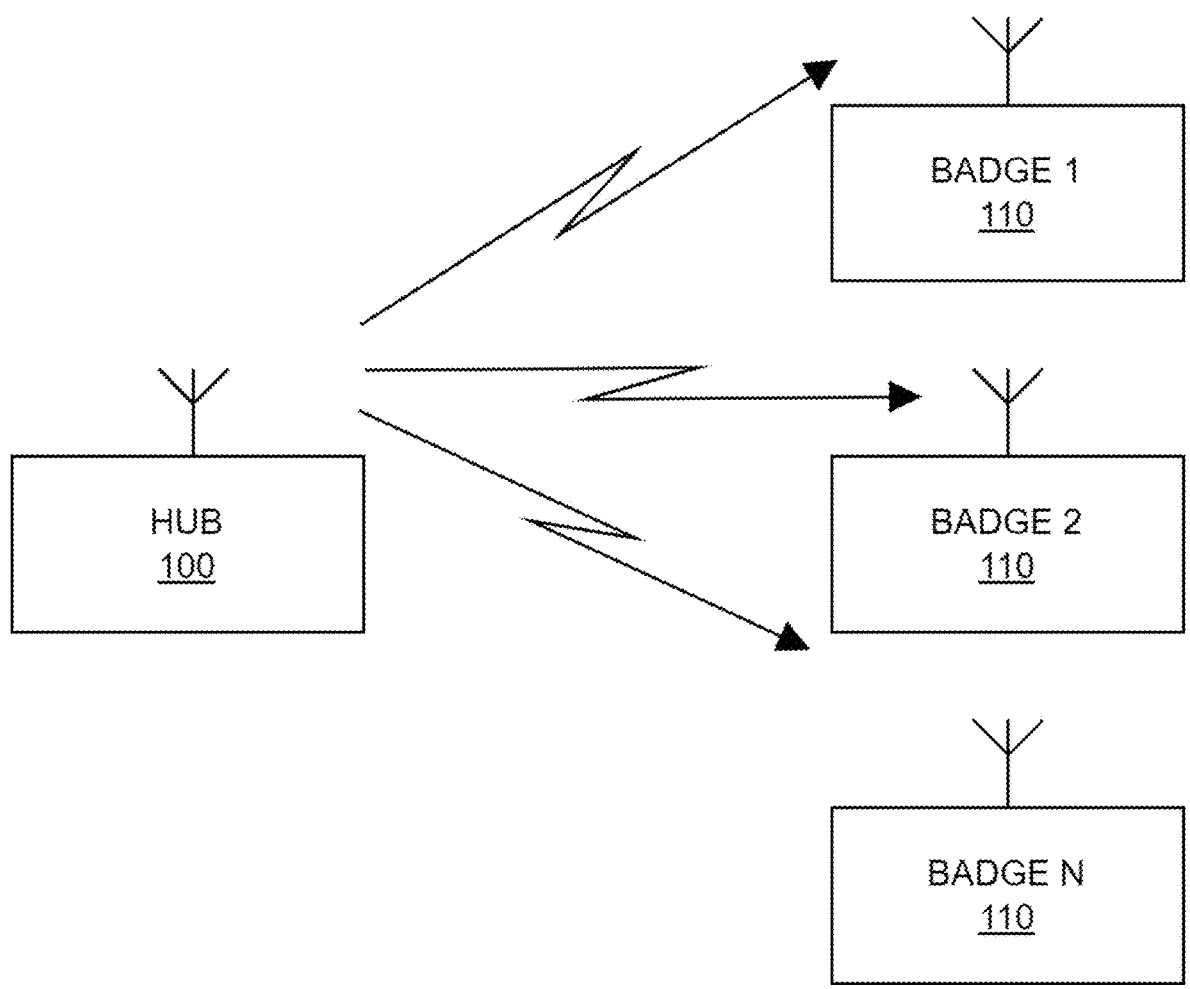
FIG. 1 shows a high-level diagram of an embodiment of the system of the present invention.

An object of the present invention is to provide a system and method for monitoring customer interactions with service professionals.

Another object of the present invention is to provide a system and method for diarizing audio files.

Another object of the present invention is to provide a system and method for monitoring social distancing behavior in employees during customer interactions.

Another object of the present invention is to provide a system and method for monitoring the safety of an employee during customer interactions.

Another object of the present invention is to provide a real-time way to monitor a customer service interaction.

The system of the present invention comprises at least one badge, configured to be worn by an employee. The badge preferably comprises a badge body, with a front surface configured to display visual information (such as the employee's name), and a top surface. Inside the badge, there are at least two microphones and a tubular channel within the badge body located in close proximity to each microphone. The tubular channels are there to focus the sound coming into the microphones from one direction preferentially to others. One tubular channel leads from one microphone to the top surface of the badge body, thus making the employee's voice sound louder to that microphone than any other sounds. Another tubular channel leads from the other microphone to the front surface of the badge body, thus making the voice of a customer standing in front of the employee louder than any other sounds. This configuration allows cheap omnidirectional microphones to be used while still retaining a directionality that enables easy diarization of the audio later.

The badge also comprises a wireless communication module and a processor and memory. The processor and memory are preferably configured to receive audio data, store the audio data, process it, encrypt it, and transmit it via the wireless communication module. The processor and memory may also be configured to detect voice activity to start recording or detect silence to stop recording.

The badges are connected to a hub, which is a computing device such as a computer, server, smartphone, tablet, or any other computing device with similar capabilities. The hub comprises a communication module and a processor and memory, which is configured to receive audio data from the at least one badge and process it. The processing steps may include detecting voice activity to delete non-speech parts of the audio; detecting keywords for timestamping the audio data or splitting it into multiple files; diarizing the audio data; identifying the age and gender of any speakers; identifying any sounds that may indicate a dangerous incident; performing a biometric analysis of any voices to identify at least one of the people speaking; identifying any languages spoken in the audio data; and converting audio data to text for easier analysis. The hub also sends commands to each badge.

In an embodiment, the badge also comprises a social distancing module that determines the distance between the badge and another device. If another device (i.e. a customer's smartphone) is too close to the badge, the badge may trigger a visible indicator to turn on, transmit a signal to the hub, or log the incident in the badge's memory.

The social distancing module preferably operates via the RSSI algorithm, wherein it scans for radio-frequency signals, determines a signal strength for each signal, and determines the attenuation of each signal and thus the distance to the signal.

The badge may also comprise an accelerometer, a gyroscope, or both. This may allow the badge to determine whether or not it is being worn by a living human. It may also allow the badge to determine whether or not the employee has fallen.

In an embodiment, the badge comprises a mute button visible to the customer and a recording indicator to indicate whether or not the badge is recording audio. Some customers do not wish to be recorded during an interaction with an employee. A visible mute button and a recording indicator that visibly indicates that the badge is not recording audio will improve customer comfort level during the interaction.

In an embodiment, the badge can store the following in memory: time and duration of on-body status, amount and duration of audio recorded, time of usage, firmware version, social distancing information.

In an embodiment, the hub comprises at least one wired connection for connecting to the at least one badge, and the badge is configured to transmit data to the hub via the wired connection.

The method of the present invention comprises providing a badge to be worn by an employee, wherein the badge comprises a badge body with a front surface and a top surface and two microphones. One microphone is located close to a first microphone channel formed within the badge body, wherein the first microphone channel leads to the top surface of the badge body. Another microphone is located close to a second microphone channel formed within the badge body, wherein the second microphone channel leads to the front surface of the badge body. The first microphone and the second microphone are then used to record the employee's interactions with customers. The audio recording is then transmitted to a hub, which is a computing device, and the hub diarizes the audio. The diarizing is performed by analyzing the volume level of audio data received by each microphone and removing the quieter sounds that are below the average volume level. This ensures that the first microphone's recording contains only the voice of the employee, and the second microphone's recording contains only the voices of any customers. The diarized audio files are then stored as two separate files or as a stereo audio file but with voices in different audio tracks. The hub then analyzes the audio with other algorithms and/or converts each file to text for further analysis.

In an embodiment, the hub is also used to identify any sounds that may indicate a violent incident taking place, to identify the age and gender of each speaker, to analyze voice intonations, and to identify at least one of the individuals who are speaking.

In an embodiment, the audio recorded on the badge is encrypted before it is transmitted to the hub. The hub then decrypts the audio data.

In an embodiment, the badge is also used to determine the distance between the employee and any customers. If the distance is less than a predetermined distance, the badge can turn on a visible indicator, transmit a signal to the hub, or log the time and date of the incident in badge memory.

In an embodiment, the badge uses the RSSI algorithm to determine the distance between the employee and a customer. This preferably comprises using the badge communication module to scan for radio-frequency signals (preferably BLE advertising packets, but other radio frequency signals may also be used), determining a signal strength for any radio-frequency signal found, and using the signal strength to determine the distance between the badge and the source of the signal.

In an embodiment, the badge also comprises an accelerometer, a gyroscope, or both. The badge can then be triggered to begin recording audio when it is being worn by a living person, detects a keyword, or detects a human voice, and to stop recording when it is not worn by a living person, when it detects a keyword, or when it detects silence.

In an embodiment, the badge can also measure various physiological parameters when worn by a living person, such as heart rate, respiration rate, body position, or body movement, and transmit data regarding these physiological parameters to the hub.

In an embodiment, the badge can determine whether or not an employee has fallen and transmit a signal to the hub if that is the case.

In an embodiment, the badge comprises a mute button and a recording indicator. The badge can then be triggered to start or stop recording audio when the mute button is pressed. The recording indicator can indicate to the customer whether or not the badge is recording audio.

In an embodiment, the badge transmits data regarding the mute button usage, recording time, or wearing time to the hub.

In an embodiment, the badge can operate in one of two modes: a continuous recording mode, wherein it continuously records audio throughout its operation, and a mute button mode, wherein it only records audio when triggered.

DETAILED DESCRIPTION

For purposes of the present disclosure, a "badge" is a wearable device for monitoring an employee's interactions. A "hub" is a computing device, such as a computer, server, smartphone, tablet, or any other device with similar capabilities, that can connect wirelessly to at least one badge.

In summary, an embodiment of the present invention comprises a plurality of wearable badges connected to a central hub. Each badge is worn by an employee while serving customers. The badge transmits audio, movement patterns, and other information to the hub for processing and analysis. In varying embodiments of the present invention, the information obtained from the badge may be audio and speech data, movement and position data (i.e. whether the wearer is standing, sitting, walking, etc.), micromovements (breathing, heart rate), positioning relative to other people or objects (i.e. whether social distancing is observed), and so on. Any or all of this information may then be reviewed and used to evaluate the employee's performance or working conditions.

A high-level diagram of an embodiment of the system of the present invention is shown as FIG. 1. A hub 100 is connected wirelessly to a plurality of badges 110. Each badge 110 is worn by an employee while serving a customer. The badges 110 communicate data to the hub 100 via any wireless protocol, such as Bluetooth Low Energy or any other comparable protocol.

In an aspect of the present invention, the hub 100 can also be connected to the badges 110 by wires, for battery charging and data transmission. The badges 110 can communicate data to and from the hub 100 via any wire interface and protocol, such as USB 2.0, 3.0, and other comparable interface and protocol and any type of connector such as micro USB, USB Type C, custom connectors based on spring contacts, magnetic connectors and other comparable connectors.

Figure 2:
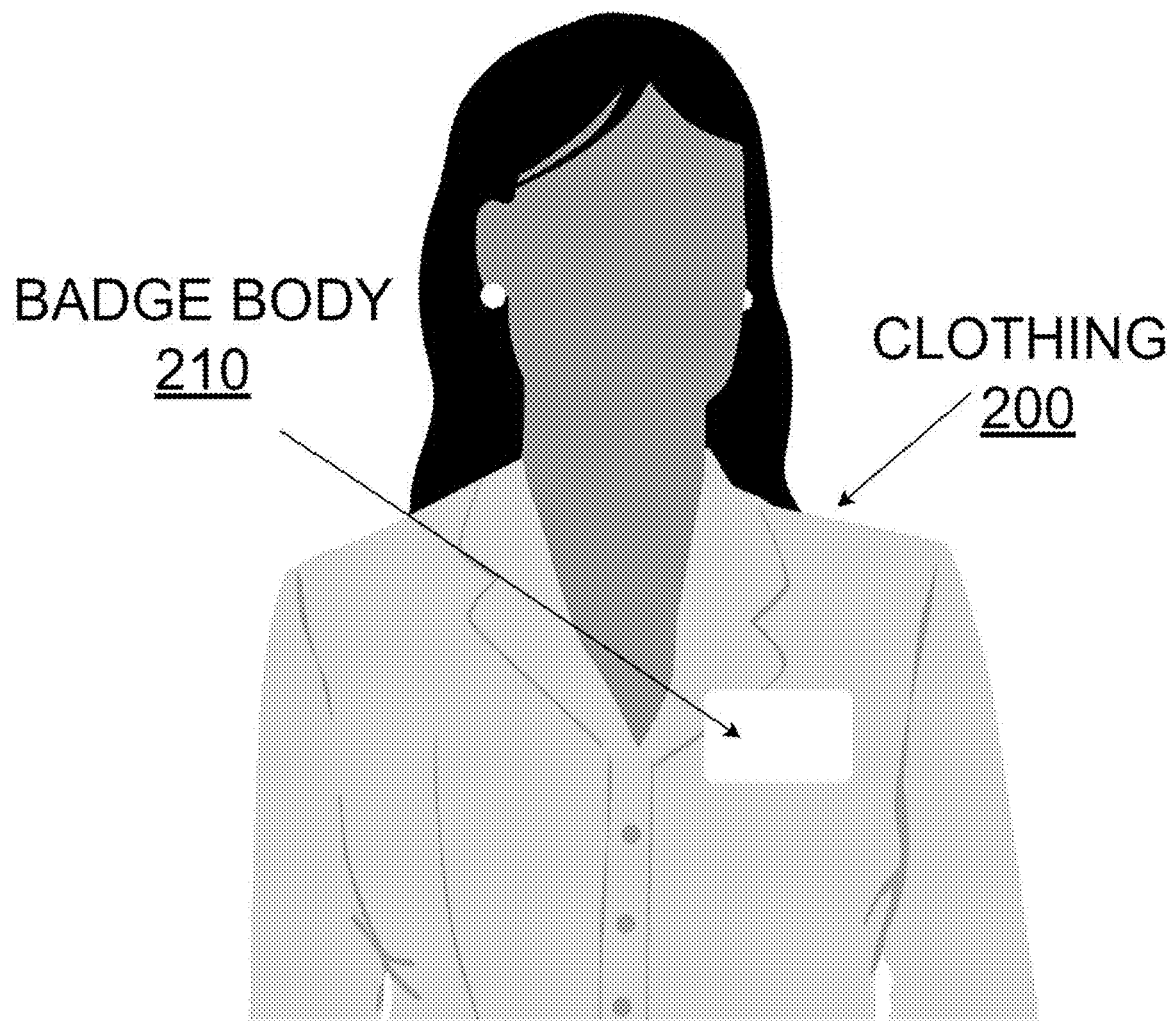
FIG. 2 shows an embodiment of a badge worn by a user.

FIG. 2 shows a badge being worn by an employee. The badge body 210 is attached to the employee's clothing 200 in any way that is secure, removable, and non-damaging to clothing. In an embodiment, a safety pin may be used. The badge body 210 may have visible information displayed on it, such as the employee's name, employee number, or any other relevant information. In an embodiment, the badge body 210 may also have at least one indicator light. In an embodiment, the indicator light may be used to indicate whether or not the badge is recording sound.

Figure 3:
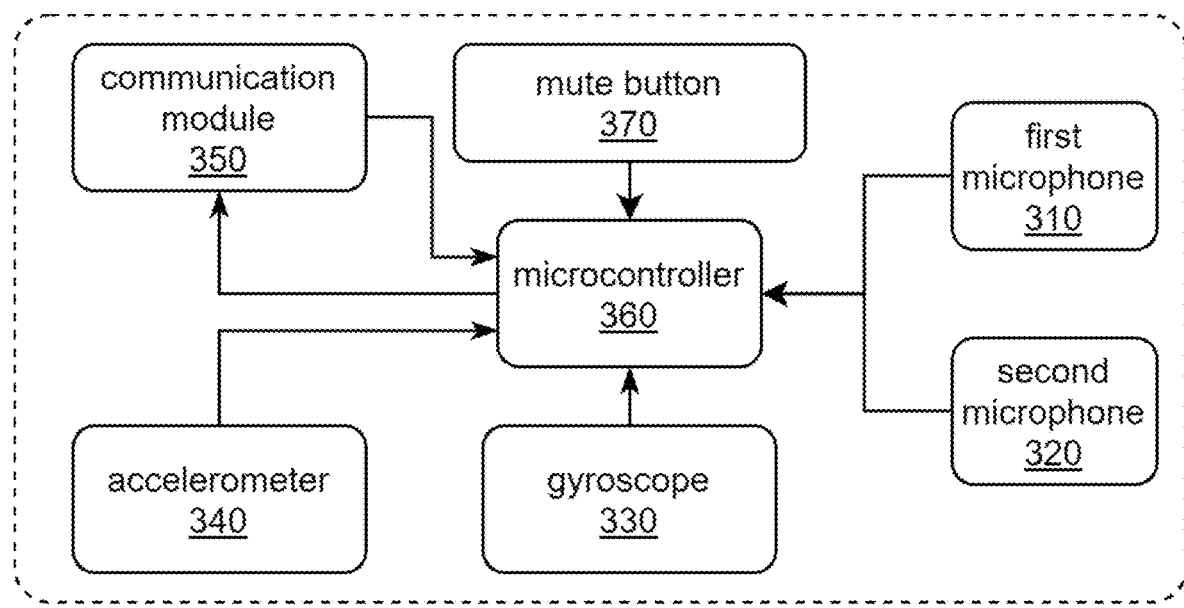
FIG. 3 shows a block diagram of an embodiment of a badge's internal structure.

FIG. 3 shows an internal structure of a badge. A microcontroller 360 controls the operation of the badge. A first microphone 310 and a second microphone 320 are connected to the microcontroller 360. In an embodiment, the number of microphones can be greater than two. The microphones are any types of microphones capable of recording sound at a distance normal for a customer service interaction; for example, digital MEMS PDM microphones can be used, or any other kind of MEMS microphones, including wake-on-sound piezoelectric microphones. As will be discussed below, each microphone is located in front of a microphone channel cut into the body of the badge, which focuses the sound coming into the microphone in order to assist in later diarization. As the employee converses with a customer, the employee's speech and the customer's speech are recorded and processed by the badge processor 360.

In an embodiment, the badge also comprises an accelerometer 340 and a gyroscope 330. It is understood that in other embodiments, the badge can comprise an accelerometer and no gyroscope, or a gyroscope and no accelerometer. In an embodiment, the accelerometer and gyroscope are the same device. In an embodiment, the badge can determine the physical position and movement status of the wearer by using the gyroscope 330 and accelerometer 340. This is preferably done in the same way as is currently done by fitness trackers and smartphones. For example, the badge can determine whether the wearer is walking, sitting, standing, and so on. In an embodiment, the badge can also track micromovements of the wearer's chest; for example, the badge can detect breathing movements, heart rate breast movements, and so on. This enables the badge to determine whether or not it is being worn by a living person and only record sound when the badge is being worn, or to determine whether the employee is in physical danger (for example, to determine whether or not the employee has fallen down).

In an embodiment, the badge comprises a communication module 350. The communication module is used to communicate data back and forth between the badge and the hub. As stated above, the communication may happen in real time or at intervals. The communication module preferably uses any commonly used wireless protocol, such as Bluetooth, Bluetooth Low Energy, or any other similar protocol.

In an embodiment, the badge comprises a mute button 370. This is very important for privacy issues; for example, a customer who does not consent to being recorded may request that audio recording be stopped. In an embodiment, the "Mute" button is clearly visible to the customer so that the customer can be assured that the recording is indeed stopped. The badge body may also comprise a visible indicator (not shown) that shows the customer that audio recording is turned off. The visible indicator is preferably a light.

Figure 4:
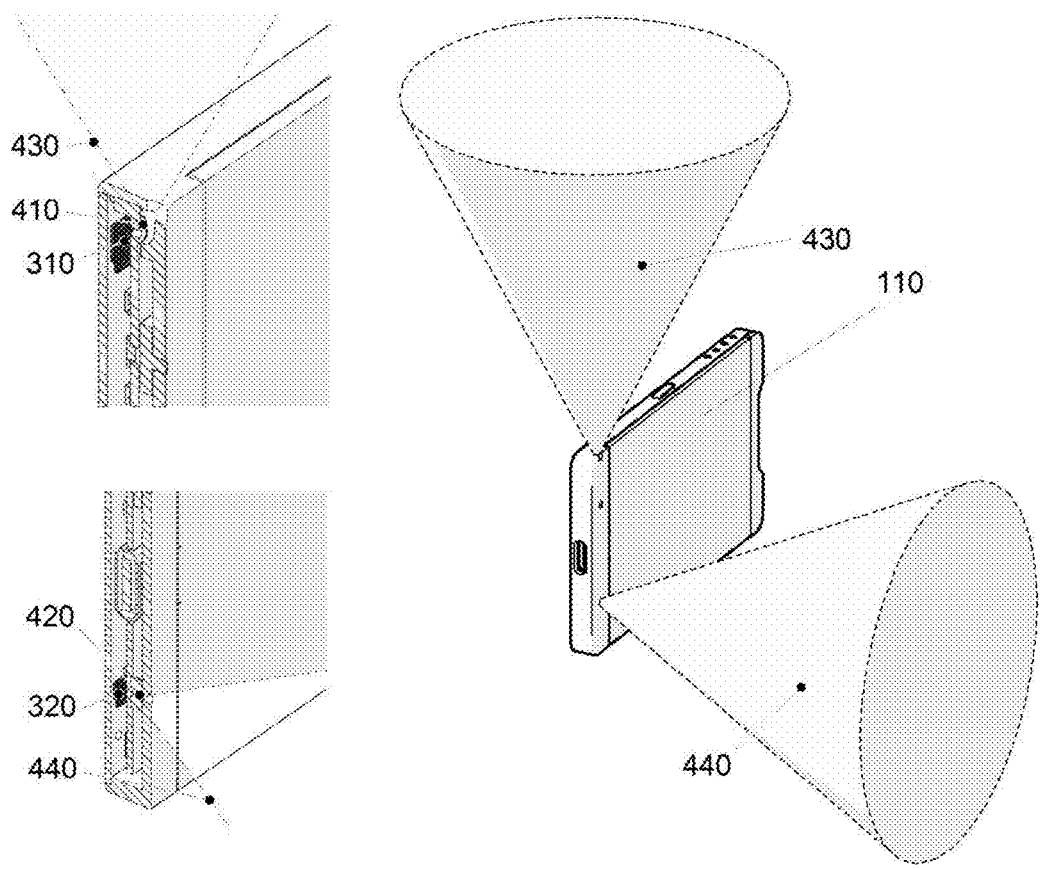
FIG. 4 shows a diagram of an embodiment of a badge's microphone arrangement and microphone channels.

The two microphones 310 and 320 are both omnidirectional microphones. In order to make it easier to diarize the audio files and distinguish between the speech of the employee and the customer, each microphone is located in front of a microphone channel as shown in FIG. 4. The first microphone channel 410 is located in front of the first microphone 310 and is a channel cut in the badge body in order to focus the sound waves coming into the microphone. The sound waves coming from the first microphone capture zone 430 are therefore louder than sounds coming from outside the zone. The first microphone channel 410 is cut in the top side of the badge body as shown in the Figure so that the employee's speech is picked up at a higher volume than any sounds coming from other directions. The second microphone channel 420 is located in front of the second microphone 320 and, similarly to the first microphone channel 410, is a channel cut in the badge body in order to focus the sound waves coming into the microphone. The second microphone channel 420 is cut in such a way as to have an opening on the front side of the badge body as shown in the Figure, so that any speech within the second microphone capture zone 440 is picked up at a higher volume than any sounds coming from other directions. This ensures that the customer's speech is picked up at a higher volume than any other sound coming from other directions.

The first and second microphone channels are preferably curved or cylindrical channels with a circular cross-section of approximately 1.5 mm. This enables the sound to be focused into the microphone so that the microphone preferentially picks up sound from some areas. Any shape of channel is appropriate as long as it focuses the sound into the microphone in such a way as to make one speaker's speech louder than another.

The badge may record audio throughout the workday (between authorization and wire hub connection) before transmitting it to the hub for analysis; however, the badge may also transmit audio more frequently. For example, the badge may transmit audio to the hub on real time via BLE or by wire connection on a daily basis, a weekly basis, a twice-daily basis, multiple times a day, or any other regular or irregular frequency. Until the audio data is transmitted to the hub, it is preferably stored on the badge in memory. The memory used for storing the audio data and any other data is preferably any commonly available memory that is suitable for storing audio data.

The badge preferably transmits data to the hub via a wired or wireless connection. In an embodiment, the badge transmits data to the hub wirelessly via BLE at regular or irregular intervals. In another embodiment, the badge transmits data to the hub when it is plugged into a wired connection to the hub at the end of an employee's work day. In an embodiment, the battery of the badge may also be charged through the same wired connection. In an embodiment, the wired connection may be a USB connection.

In an embodiment of the invention, a very important step in processing the audio data is diarizing it, namely separating it into two audio streams—the customer's speech and the employee's speech. This then creates two audio files for each conversation, which is useful for further speech recognition. In an embodiment, the separation is accomplished by handling data streams from each microphone independently. As stated above, the first microphone 310 is preferably positioned in front of the first microphone channel 410 that ensures that the employee's voice sounds louder than any other voices for that microphone. The second microphone 320 is positioned in front of the second microphone channel 420 that ensures that the voice of anyone standing in front of the employee sounds louder than any other voices for that microphone. The audio is then transmitted into the hub for diarization. The hub preferably processes the audio using an AI algorithm that is trained to distinguish different voices. In an embodiment, the AI algorithm may also be trained to biometrically identify each employee's voice. During diarization, the AI algorithm distinguishes different voices in the audio file coming from each microphone, and erases all but the loudest voices for each one. This ensures that when the audio file recorded by the first microphone is processed, it will contain only the employee's voice, and when the audio file recorded by the second microphone is processed, it will contain only the voices of the customers.

The data streams from each microphone may be combined into one stereo audio file (with the customer's voice in one channel and the professional's voice in another), or may be handled independently as two mono audio files.

In an embodiment, the hub performs other processing tasks on the audio files. For example, it can detect voice activity to delete the non-speech parts of the audio, to simplify processing. Alternately, it can detect non-speech sounds like gunshots or the sound of a struggle and determine whether the employee is in danger. The hub may also detect keywords to timestamp the audio data or to split the audio data into multiple files for multiple interactions.

The hub may also perform various analysis tasks on the audio files. For example, it may identify the age and gender of any of the speakers, or perform a biometric analysis on the voices to identify any of the speakers. The hub may identify any languages spoken in the audio files. Finally, the hub may also convert audio data to text for easier analysis of the employee's performance.

In an embodiment, any data transmitted from the badge to the hub, or the data stored on the badge, or both is encrypted. The data can be decrypted in the hub or in the cloud.

Each badge can communicate bidirectionally with the hub. In the system, each badge is assigned a badge ID. The badge ID may be a number, an alphanumerical sequence, or any other sequence of symbols that is unique to each badge and constant during product life. The badge ID is preferably associated with an employee name and/or ID, so that each employee's individual performance may be tracked.

The badge might act as an authentication device (laptop, cash machine, etc.), using a built-in secure storage/secure element.

In an embodiment, the start and stop of audio recording can be triggered by a keyword or audio signal detection, utilizing voice activity detection and hotword detection technologies. Audio recording may also be manually stopped and started by the "Mute" button 370.

Figure 5:
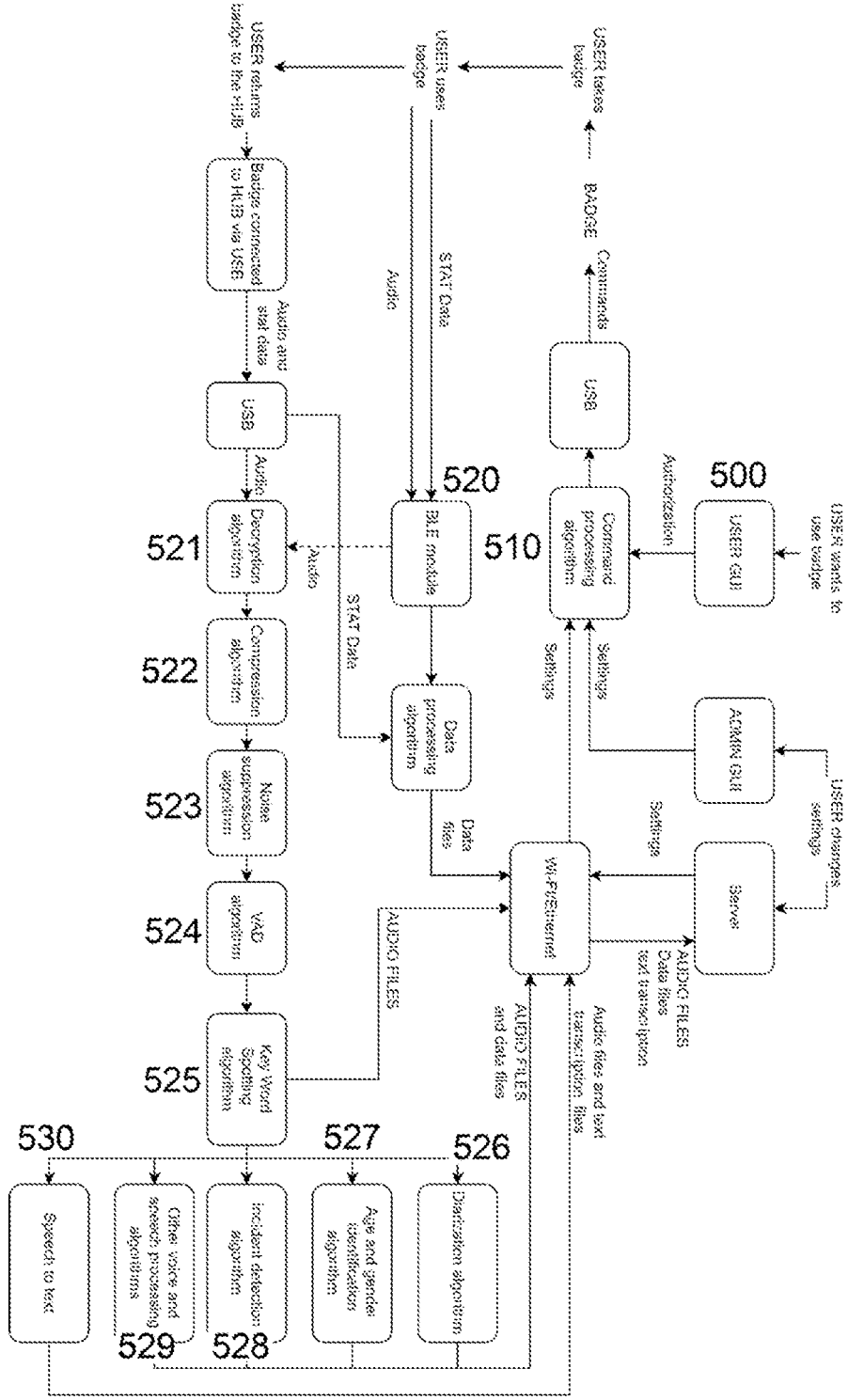
FIG. 5 shows a diagram of the hub's operation.

FIG. 5 shows a diagram of an embodiment of the hub operation. When the user wants to use the badge, they go through the user GUI 500 to authorize the operation of a badge. In order to do so, the user has to enter their name and/or identification number so that it is associated with the badge. The authorization goes through the command processing algorithm and a badge is authorized for the user. As the user is using the badge, in an aspect of the invention, some statistical data and/or audio may be transmitted to the communication module 520 and processed. The audio goes through a decryption algorithm 521, a compression algorithm 522, a noise suppression algorithm 523, and a VAD algorithm 524, and then a keyword spotting algorithm 525 to identify any keywords. After that, the audio goes through a diarization algorithm 526. The diarized audio then is processed by various algorithms, including an age and gender identification algorithm 527, an incident detection algorithm 528 (for identifying violent incidents), a voice intonation detection algorithm 531, a biometric identification algorithm 532, any other voice and speech processing algorithms 533, and a speech to text conversion 530. The non-speech data from the badge is also fed into the social distancing algorithm 529. The processed audio files, text transcription files, and any other data are then transmitted to a server for further analysis.

The hub can also receive audio and statistical data from the badge via USB after the user returns the badge to the hub. Once the audio and statistical data is transmitted from the badge to the hub, it goes through the same algorithms as detailed above.

The user may also change various settings on the badge. These settings may include the name of the user using the badge, voice activation settings, social distancing settings, and so on. One of the settings is whether or not the badge records audio continuously or only records when the Mute button is pressed. This can be changed by the user or by the user's supervisor.

Figure 6:
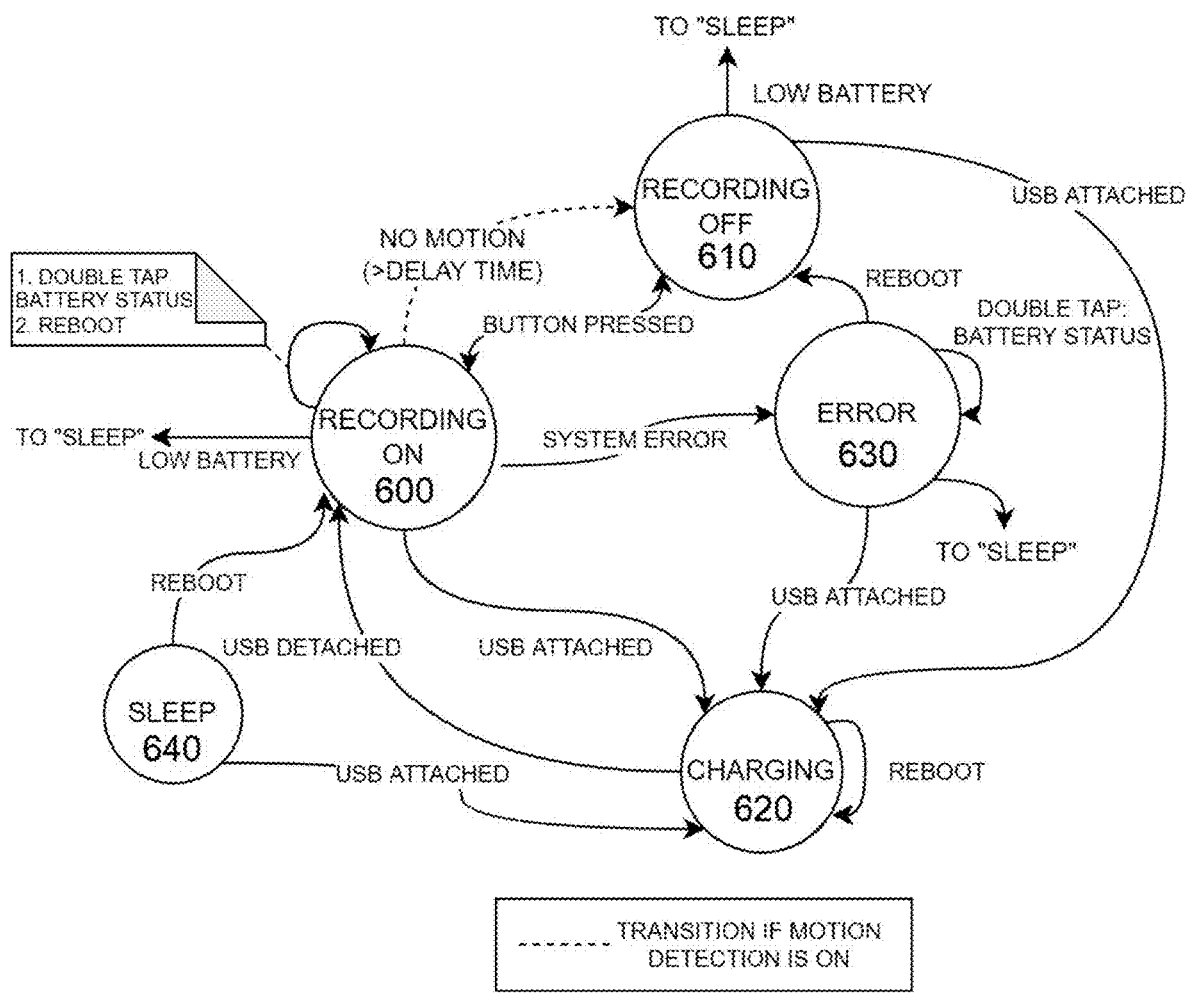
FIG. 6 shows a diagram of a badge's operation in an embodiment of the invention.

FIG. 6 shows a diagram of the badge operation in a setting where the badge only records when the Mute button is pressed. The badge toggles between "Recording ON" 600 and "Recording OFF" 610 when the mute button is pressed. If the USB is attached, the badge goes into a "Charging" state 620 and may be rebooted as shown. If the battery is low, the badge goes into a "Sleep" state 640 until the USB is attached. If there is a system error of any kind, the badge goes into an "Error" state 630 and then into a "Sleep" state 640, as shown.

Figure 7:
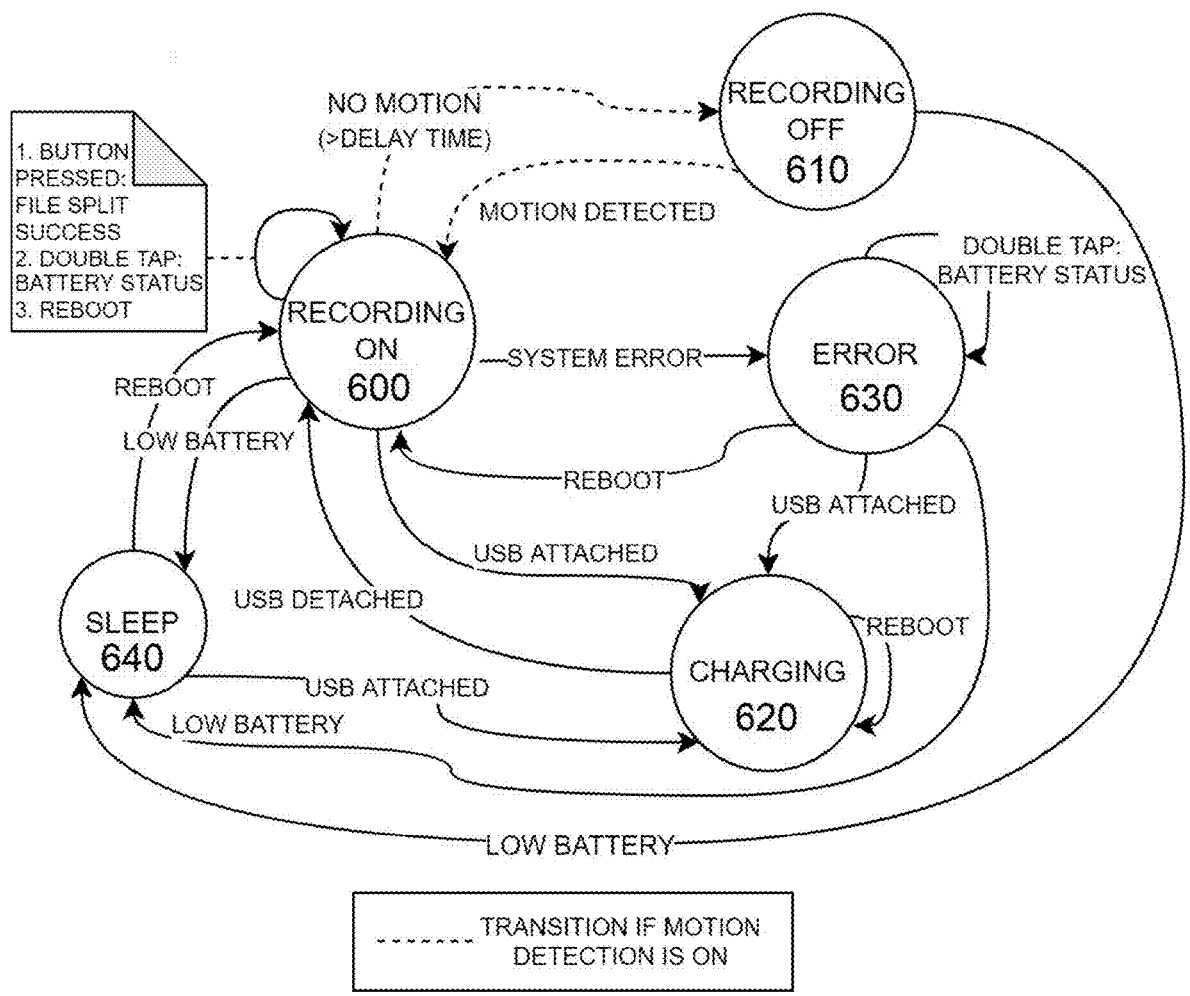
FIG. 7 shows a diagram of a badge's operation in another embodiment of the invention.

FIG. 7 shows a diagram of badge operation in a setting where the badge records continuously. In this embodiment, the badge toggles between "Recording ON" and "Recording OFF" when motion is detected or when no motion is detected (after a suitable delay time). If the USB is attached, the badge goes into a "Charging" state and may be rebooted as shown. If the battery is low, the badge goes into a "Sleep" state until the USB is attached. If there is a system error of any kind, the badge goes into an "Error" state and then into a "Sleep" state, as shown.

In an embodiment, the badge may measure the distance between the wearer and other people. This data may be useful for tracking the wearer's social distancing behavior during a pandemic, determining whether or not the wearer is in physical danger, and other applications of a similar nature. In the preferred embodiment, a Received Signal Strength Indicator algorithm (RSSI) is used to determine the badge's distance from another device, presumably a device carried by a customer. The badge communication module preferably uses Bluetooth Low Energy to estimate the distance of another device from the badge. The badge communication module switches between the Advertising state and the Scanning state in the Bluetooth Low Energy (BLE) protocol. In the Advertising state, the badge sends out a signal to trigger any other devices in the near vicinity to respond. In the Scanning state, the badge scans for any other device's signals and measures its Received Signal Strength Indicator (RSSI). The attenuation of each signal is then used to determine the distance between the badge and the corresponding other device. In the preferred embodiment, the badge stores the addresses, RSSI, and the number of times an advertising report was received. The information is then stored in a dynamic list to be averaged and recalculated to the corresponding proximity zones. Proximity zones are defined by distance as determined from the RSSI.

Figure 8:
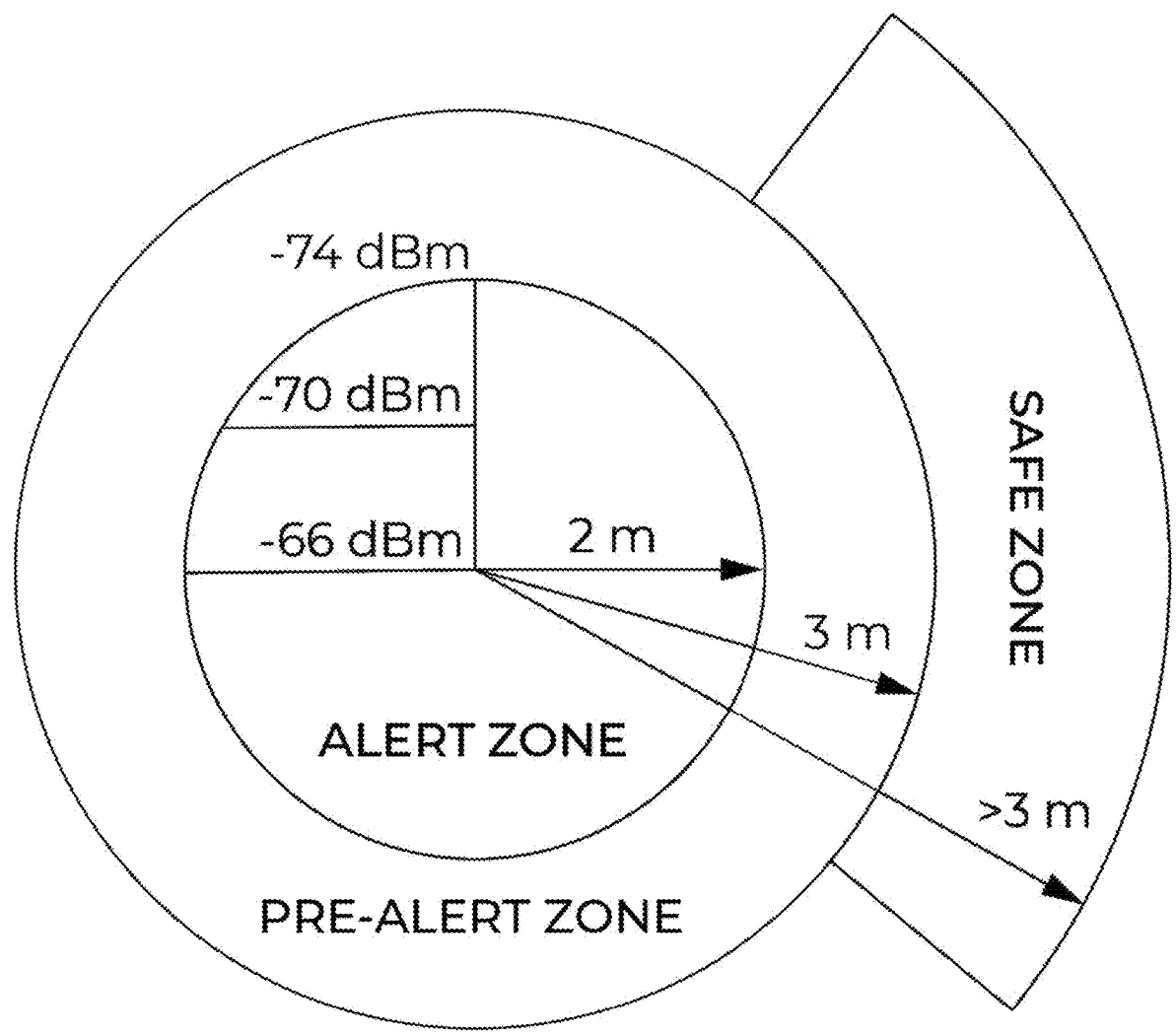
FIG. 8 shows a diagram of various attenuation values used for social distancing measurement in an embodiment of the present invention.

FIG. 8 shows a sample attenuation/distance diagram that may be used to calculate the distance between the badge and another device and apply it to COVID-19 or any other pandemic guidelines that require at least 2 m of social distancing. As can be shown, an attenuation level of −66 dBm or greater means that the other device is closer than 2 m to the badge, meaning that social distancing guidelines have been breached and the customer is in the "alert zone". An attenuation level between −70 and −74 dBm means that the other device is between 2-3 m from the badge, meaning that the customer is almost close enough to breach social distancing guidelines, placing them in the "pre-alert zone". An attenuation level of −74 dBm or more means that the other device is more than 3 m away from the badge, meaning the customer is within the "safe zone" for interaction.

In an embodiment, the badge may notify the wearer, notify the customer, or send a signal to the hub when social distance guidelines are not followed. In an embodiment, the badge may turn on a visible or audible indicator that is visible or audible to the customer or to the employee. The indicator may be a light, a beep, an audio recording, or any other visible or audible indicator. In another embodiment, the badge may log any incidents where social distance guidelines were not followed in memory and transmit them to the hub at regular or irregular intervals.

It is understood that the above is solely an example of a particular distancing guideline, and that the system and method of the present invention may be used for any other distances and any other rationale for distancing between the employee and the customer. For example, the badge may also detect whether or not the customer is close enough to the employee for a physical attack to be likely and alert management or the appropriate authorities.

Exemplary embodiments are described above. It will be understood that the above disclosure encompasses other embodiments that form reasonable equivalents to the embodiments in the above description.

The invention claimed is:

1. A system for monitoring customer interactions, comprising:
   at least one badge, wherein each badge is configured to be worn by an employee interacting with a customer, comprising:
   a badge body comprising a front surface, wherein the front surface is configured to display visual information, and a top surface;
   a first microphone and a second microphone located within the badge body;
   a first microphone channel formed within the badge body, wherein the first microphone channel comprises a tubular opening within the badge body leading from the first microphone to the top surface of the badge body;
   a second microphone channel formed within the badge body, wherein the second microphone channel comprises a tubular opening within the badge body leading from the second microphone to the front surface of the badge body;
   a wireless communication module;
   a badge processor and memory, said badge processor and memory configured to perform at least one of the following actions:
   receive audio data from the first microphone and the second microphone;
   store the audio data;
   process the audio data;
   encrypt the audio data;
   transmit the audio data;
   detect voice activity to start recording;
   detect silence to stop recording;
   a hub connected to at least one badge, wherein the hub is a computing device, comprising:
   a communication module;
   a hub processor and memory, said hub processor and memory configured to
   perform the following actions:
   receive audio data from the at least one badge;
   process the audio data by performing at least one of the following actions:
   detect voice activity to delete non-speech parts of the audio;
   detect keywords to timestamp the audio data or to split the audio data;
   diarize the audio data;
   identify age and gender of any speakers;
   identify sounds that may indicate a dangerous incident;
   perform a biometric analysis of any voices to identify at least one person speaking;
   identify any languages spoken in the audio data;
   convert audio data to text;
   send commands to at least one badge.

2. The system of claim 1, wherein the badge further comprises:
   a social distancing module, wherein the social distancing module is configured to determine a distance between the at least one badge and another device;
   wherein the badge processor and memory is further configured to perform the following actions:
   determine whether the distance is less than a specified distance for social-distancing guidelines;
   if the distance is less than the specified distance, perform at least one of the following actions:
   trigger a visible indicator located on the badge to turn on;
   transmit a signal to the hub via the communication module;
   log the incident in the badge's memory.

3. The system of claim 2, wherein the social distancing module is configured to determine the distance between the at least one badge and another device by performing the following actions:
   scanning for radio-frequency signals;
   if any radio-frequency signals are found, determining a signal strength for each radio-frequency signal;
   determining if a signal strength for any radio-frequency signal exceeds a predetermined signal strength.

4. The system of claim 1, wherein the at least one badge further comprises at least one of the following:
   an accelerometer;
   a gyroscope;
   and wherein the badge processor and memory is further configured to transmit data received from the at least one of the accelerometer and gyroscope via the communication module.

5. The system of claim 4, wherein the badge processor is further configured to determine whether or not the badge is being worn by a living human.

6. The system of claim 4, wherein the badge processor is further configured to determine whether or not the employee has fallen.

7. The system of claim 1, wherein the at least one badge further comprises:
   a mute button visible to the customer when the badge is worn by the employee, said mute button configured to start or stop audio recording when triggered; and
   a recording indicator visible to the customer when the badge is worn, said recording indicator configured to indicate whether or not the badge is recording audio.

8. The system of claim 1, wherein the at least one badge is configured to store at least one of the following in badge memory: time and duration of on-body status, amount and duration of audio recorded, time of usage, firmware version, social distancing information.

9. The system of claim 1, wherein the hub comprises at least one wired connection, and wherein the at least one badge is configured to transmit data to the hub via the wired connection.

10. A method of analyzing an employee's performance, comprising:
   providing a badge to be worn by the employee, comprising a badge body with a front surface and a top surface, a first microphone, and a second microphone, wherein the badge comprises a first microphone channel formed within a badge body, wherein the first microphone channel comprises a tubular opening within the badge body leading from the first microphone to the top surface of the badge body, and a second microphone channel formed within the badge body, wherein the second microphone channel comprises a tubular opening within the badge body leading from the second microphone to the front surface of the badge body;
   using the first microphone and the second microphone to record audio from the employee's interaction with a customer;
   transmitting the audio to a hub, wherein a hub is a computing device;
   using the hub to diarize the audio by performing the following steps:
      analyzing the volume level of audio data received by the first microphone;
      using an AI algorithm to distinguish at least two different voices in the audio data;
      determining the volume level of each voice and determining which voice has the highest volume level;
      erasing all the voices except for the voice with the highest volume level and saving the resulting audio as a first processed audio file;
      analyzing the volume level of audio data received by the second microphone;
      using an AI algorithm to distinguish at least two different voices in the audio data;
      determining the volume level of each voice and determining which voice has the highest volume level;
      erasing all the voices except for the voice with the highest volume level and saving the resulting audio as a second processed audio file;
   using the hub to convert the first processed audio file and the second processed audio file to text;
   using the hub to analyze the text to evaluate the employee's performance.

11. The method of claim 10, further comprising at least one of the following:
   using the hub to identify any sounds in the audio file that could indicate a violent incident;
   using the hub to identify age and gender of each speaker;
   using the hub to analyze the voice intonations;
   using the hub to identify at least one individual who is speaking.

12. The method of claim 10, further comprising:
   using the badge to encrypt any audio data recorded by at least one of the first microphone and the second microphone;
   after transmitting the audio to the hub, using the hub to decrypt the audio data.

13. The method of claim 10, further comprising:
   using the badge to determine a distance between the employee and a customer;
   if the distance is less than a predetermined distance, performing one of the following actions:
      turning on a visible indicator;
      transmitting a signal to the hub;
      logging the time and date in the memory of the badge.

14. The method of claim 12, wherein the step of using the badge to determine a distance between the employee and a customer comprises:
   scanning for radio-frequency signals;
   if any radio-frequency signals are found, determining a signal strength for each radio-frequency signal;
   using the signal strength to determine a distance between the badge and a source of the radio frequency signal.

15. The method of claim 10, wherein the badge further comprises at least one of an accelerometer and gyroscope, further comprising:
   triggering the badge to begin recording audio when one of the following occurs:
      the badge is worn by a living person;
      the badge detects a keyword;
      the badge detects a human voice;
   triggering the badge to stop recording audio when one of the following occurs:
      the badge is not worn by a living person;
      the badge detects a keyword;
      the badge detects silence.

16. The method of claim 10, wherein the badge further comprises at least one of an accelerometer and gyroscope, further comprising:
   determining whether or not the badge is worn by a living person;
   if the badge is being worn by a living person, determining at least one of the following physiological parameters:
      heart rate;
      respiration rate;
      body position;
      body movement;
   transmitting information regarding the at least one of the physiological parameters to the hub.

17. The method of claim 10, wherein the badge further comprises at least one of an accelerometer and gyroscope, further comprising:
   using the at least one of the accelerometer and gyroscope to determine whether or not the employee has fallen;
   transmitting a signal to the hub if the employee has fallen.

18. The method of claim 10, wherein the badge further comprises a mute button visible to the customer when the badge is worn, said mute button configured to start or stop audio recording when triggered, and a recording indicator visible to the customer when the badge is worn, said recording indicator configured to indicate whether or not the badge is recording audio, further comprising:
   using the mute button to trigger the badge to stop recording audio;
   using the recording indicator to indicate that the badge is not recording;

using the mute button to trigger the badge to start recording audio;
using the recording indicator to indicate that the badge is recording.

19. The method of claim 10, wherein the step of transmitting the first processed audio file and the second processed audio file to a hub connected to the badge further comprises at least one of the following:
transmitting mute button usage data to the hub;
transmitting recording time data to the hub;
transmitting a length of time for the badge being worn by a living person to the hub.

20. The method of claim 18, further comprising:
after the step of providing the badge, setting up the badge to be in one of the following two modes of operation:
a continuously recording mode, wherein the badge continuously records audio throughout its operation;
a mute button mode, wherein the badge only records audio when the mute button is triggered.

* * * * *